No. 842,399. PATENTED JAN. 29, 1907.
J. GEORGE & C. M. SHORTLE.
SHEET GLASS DRAWING FURNACE.
APPLICATION FILED AUG. 19, 1904.
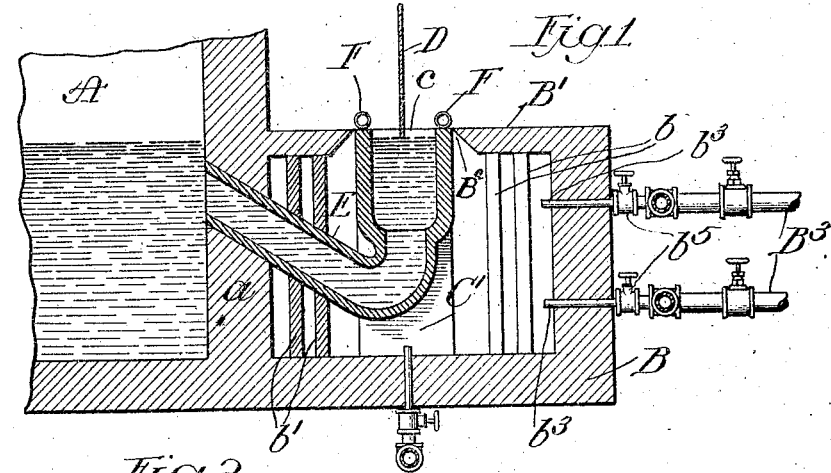
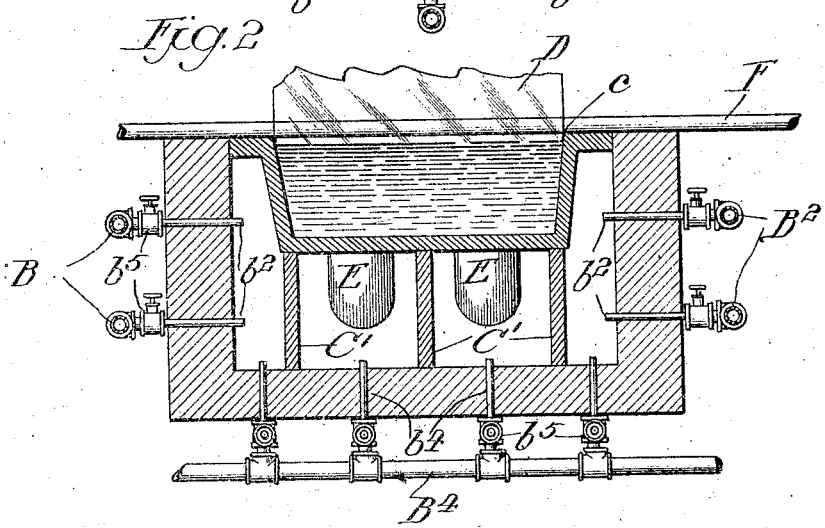
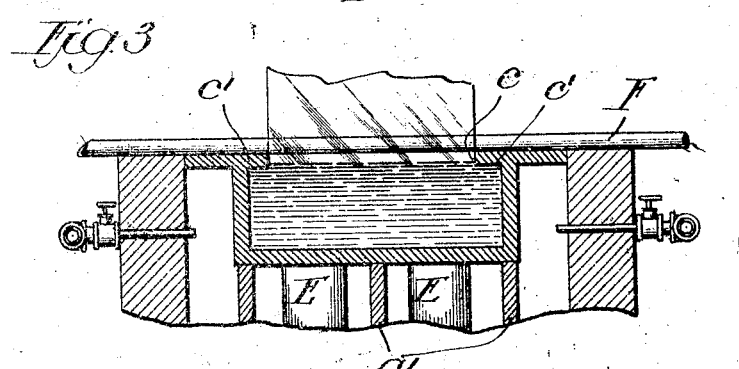
Witnesses,
Edw. R. Barrett
W. D. Hall
Inventors
Japhus George
Christopher M. Shortle
by Robert Brown Attys.

UNITED STATES PATENT OFFICE.

JAPHUS GEORGE, OF WILCOX, PENNSYLVANIA, AND CHRISTOPHER M. SHORTLE, OF BERNHARDS BAY, NEW YORK, ASSIGNORS, BY MESNE ASSIGNMENTS, TO NEWKIRK GLASS COMPANY, OF PIERRE, SOUTH DAKOTA, A CORPORATION OF SOUTH DAKOTA.

SHEET-GLASS-DRAWING FURNACE.

No. 842,399.     Specification of Letters Patent.     Patented Jan. 29, 1907.

Application filed August 19, 1904. Serial No. 221,430

*To all whom it may concern:*

Be it known that we, JAPHUS GEORGE and CHRISTOPHER M. SHORTLE, citizens of the United States, of Wilcox, Elk county, State of Pennsylvania, and of Bernhards Bay, in the county of Oswego and State of New York, respectively, have invented certain new and useful Improvements in Sheet-Glass-Drawing Furnaces; and we do hereby declare that the following is a full, clear, and exact description thereof, reference being had to the accompanying drawings, and to the letters of reference marked thereon, which form a part of this specification.

This invention relates to improvements in apparatus for drawing glass sheets from molten glass, and refers more specifically to a novel combination with a glass-melting furnace of a drawing pot or receptacle from which the glass sheets are drawn.

The invention consists in the matters hereinafter set forth, and more particularly pointed out in the appended claims.

An apparatus embodying our invention embraces, in general terms, in combination with a melting-furnace of any desired construction, a hollow nose or extension provided in its top wall or cap with a draft-opening, a self-feeding drawing-pot of relatively small capacity located within the nose in line with said draft-opening, into which the molten glass is fed from the furnace through suitable conduits and from the molten glass in which pot the sheets are drawn upwardly.

In the drawings, Figure 1 is a fragmentary vertical section of a glass-melting furnace and its nose, showing in cross-section our improved self-feeding pot in position therein. Fig. 2 is a vertical section of the nose and pot taken lengthwise of the pot. Fig. 3 is a similar section showing a slightly-modified form of the pot.

As shown in the drawings, A designates a glass-melting furnace, and B designates the hollow nose of the furnace, provided in its cap or top wall B' with a draft-opening B$^a$. C designates an open-topped drawing-pot, located within said nose in line with the draft-opening and from which the glass is drawn upwardly to form the sheet D. The pot fills the nose from end to end thereof and the cap or top wall of the nose fits closely against the sides of the pot near the top thereof to prevent radiation from the interior heat of the nose acting directly upon the formed sheet D.

Molten glass is fed from the melting-furnace A to the drawing-pot C through the medium of one or more conduits E, which open through the wall $a$ of the furnace adjacent to the nose below the level of the molten glass therein and incline downwardly and communicate at their lower ends with the drawing-pot through the bottom wall thereof. The drawing-pot is supported from the bottom wall or floor of the nose through the medium of columns or piers C', as shown in Figs. 2 and 3, and the top wall or cap of the nose is supported from said bottom wall or floor of the nose through the medium of like piers $b\ b'$. The piers or columns $b'$ also support the self-feeding conduits E and for this purpose are made of some width and provided with openings through which said conduits extend in the manner shown in Fig. 1.

The drawing-pot C is shown as supported with its upper edge at or near the level of the upper surface of the cap or top wall B' of the nose, so that the level of the molten glass in said drawing-pot may be brought closely to the top of said nose.

F F designate cooling-pipes or water-jackets, which are supported, as herein shown, upon the upper margins of the longitudinal side walls of the drawing-pot and through which a cooling medium, such as water, is circulated to maintain temperature in the space at the base of the forming-sheet sufficiently low to cause the film of glass drawn upwardly from the body of the molten glass in the pot to take and retain permanent form as soon as it emerges from the molten glass.

Heat is applied to the drawing-pot and its feeding-conduits to maintain the glass in a proper consistency for drawing by the combustion of a burning gas directed into said nose through the medium of suitable pipes $b^2\ b^3\ b^4$, the pipes $b^2$ extending through the end walls of the nose, the pipes $b^3$ through the front wall, and the pipes $b^4$ extending through the bottom wall thereof. The pipes $b^2\ b^3\ b^4$ receive gas from and constitute branches of larger feeding-pipes or heads B$^2$ B$^3$ B$^4$, respectively, which may or may not be connected with each other to receive gas from a common source of supply. Said branch pipes are so located that the flames derived from the ignition of the burning mixture passing therethrough play over the pot and the feeding-conduits E, and thereby maintain the glass contained therein at a proper consistency for drawing. The branch pipes $b^2$ $b^3$ $b^4$ are shown as provided with valves $b^5$, whereby the heat directed to different parts of the pot and conduit may be controlled.

The end walls of the pot are herein shown as provided above the molten glass in the pot with vertical surfaces $c$ in contact with which the sheet or film of glass is drawn as it rises from the molten glass, the said film clinging at its side margins to said surfaces, whereby is avoided the narrowing or tapering of the sheet and the uneven formation of said margins. This feature of the construction is disclosed and its advantages pointed out in our copending application for patent on process of drawing sheet-glass, filed on the 19th day of August, 1904, Serial No. 221,431. As shown in Fig. 2, the end walls are inclined downwardly and inwardly and said surfaces $c$ are formed at the upper edges of the end walls thereof. In the construction shown in Fig. 3 the end walls of the pot are vertical and the surfaces $c$ are formed on overhanging ledges $c'$ at the tops of said end walls.

The structural details of the apparatus herein shown are intended to be merely illustrative of approved forms of the invention and are not intended to impose limitations except as they are hereinafter made the subject of specific claims.

We claim as our invention—

1. The combination with a glass-melting furnace and a hollow nose provided in its cap or top wall with a draft-opening, of an open-topped drawing-pot supported in said nose in line with said draft-opening, and a conduit or conduits located below the level of the surface of the molten glass in the furnace for conducting the molten glass from the furnace to the drawing-pot and exposed at the sides and top and bottom surfaces thereof to the heat of the interior of the nose.

2. The combination with a glass-melting furnace and a hollow nose provided in its cap or top wall with a draft-opening, of an open-topped drawing-pot supported in said nose in line with said draft-opening, and a conduit or conduits leading from the furnace below the level of the surface of the molten glass therein and opening into the drawing-pot at the bottom thereof and exposed at the sides and top and bottom thereof to the temperature of the interior of the nose, the top wall or cap of the nose fitting the pot closely to prevent radiated heat from the interior of the nose acting directly upon the formed sheet of glass drawn from the molten glass in said pot.

3. The combination with a glass-melting furnace and a hollow nose provided in its cap or top wall with a draft-opening, of an open-topped drawing-pot supported in said nose in line with said draft-opening, a conduit or conduits located within the nose and below the level of the surface of the molten glass for conducting the molten glass from the furnace to the drawing-pot and exposed at the sides and the top and bottom thereof to the temperature of the interior of the nose, and means for supplying heat within the nose for heating the drawing-pot and the conduit or conduits.

4. The combination with a glass-furnace and its nose provided in its cap or top wall with a draft-opening, of a drawing-pot located in alinement with said opening, and a conduit or conduits for feeding glass from the furnace to the drawing-pot, the end walls of the drawing-pot being provided with integral non-cooling vertical surfaces located in position to be engaged by the side margins of the sheet or film of glass as it rises from the molten glass in said pot.

5. In a sheet-glass-drawing furnace, a drawing pot or receptacle adapted to contain molten glass from which the sheet is drawn, said pot or receptacle being provided with integral non-cooling vertical surfaces, parallel with each other, and located in position to be engaged by the side margins of the sheet or film of glass immediately upon its emergence from the molten glass in the pot and to which the margins of said sheet or film adhere as the sheet is drawn upwardly.

In testimony that we claim the foregoing as our invention we affix our signatures, in presence of two witnesses, JAPHUS GEORGE, this 18th day of July, A. D. 1904, and C. M. SHORTLE, this 29th day of July, A. D. 1904.

JAPHUS GEORGE.
CHRISTOPHER M. SHORTLE.

Witnesses to signature of George:
F. W. ALDRICH,
S. G. LATTA.

Witnesses to signature of Shortle.
M. M. GALLAGHER,
FRANK PEACHIN.